P. THEADORE.
SAFETY STOP APPARATUS.
APPLICATION FILED MAY 7, 1918.
1,273,951.
Patented July 30, 1918.
2 SHEETS—SHEET 1.
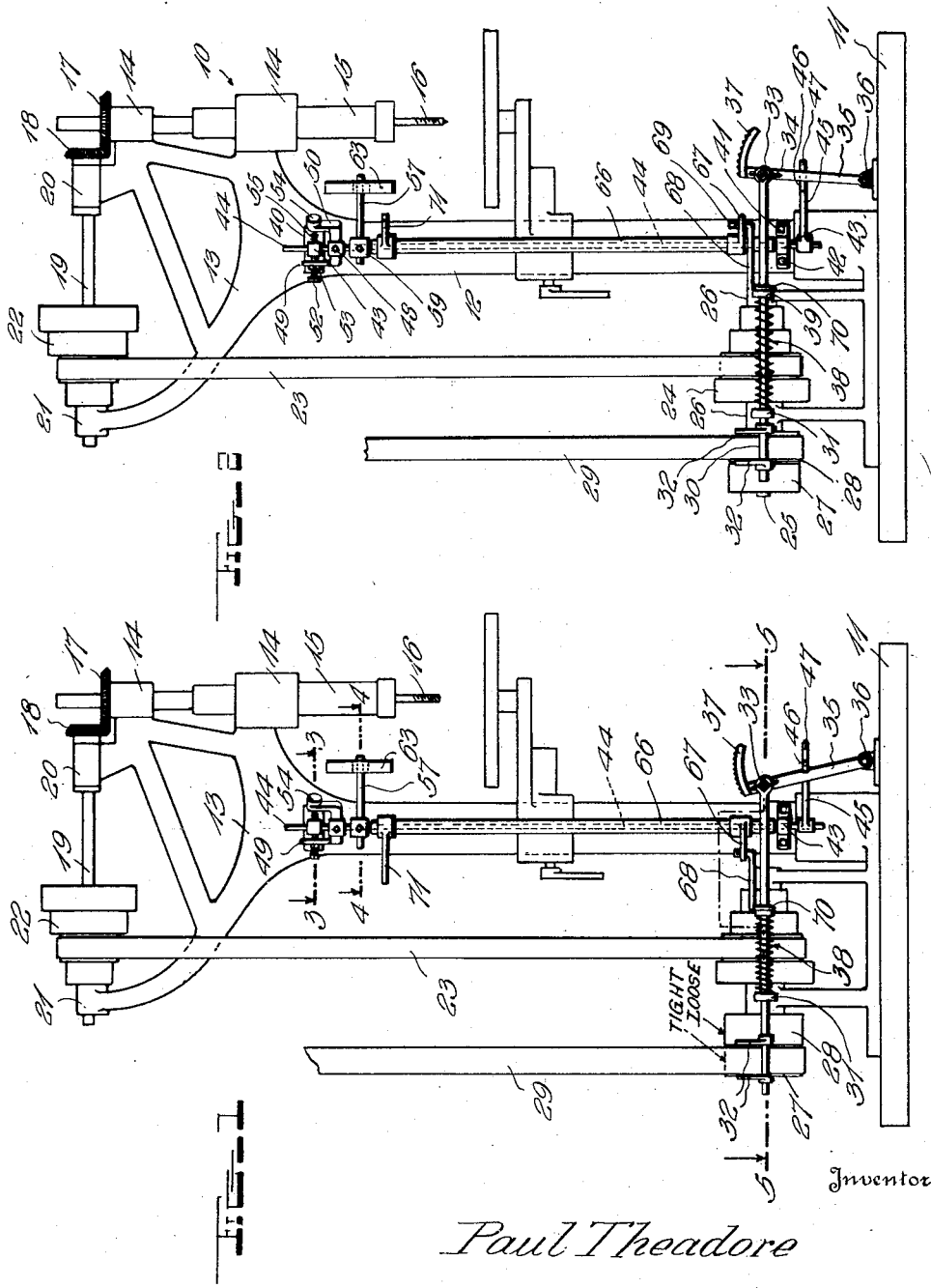
Inventor
Paul Theadore
By C. L. Parker
Attorney P. THEADORE.
SAFETY STOP APPARATUS.
APPLICATION FILED MAY 7, 1918.
1,273,951.
Patented July 30, 1918.
2 SHEETS—SHEET 2.
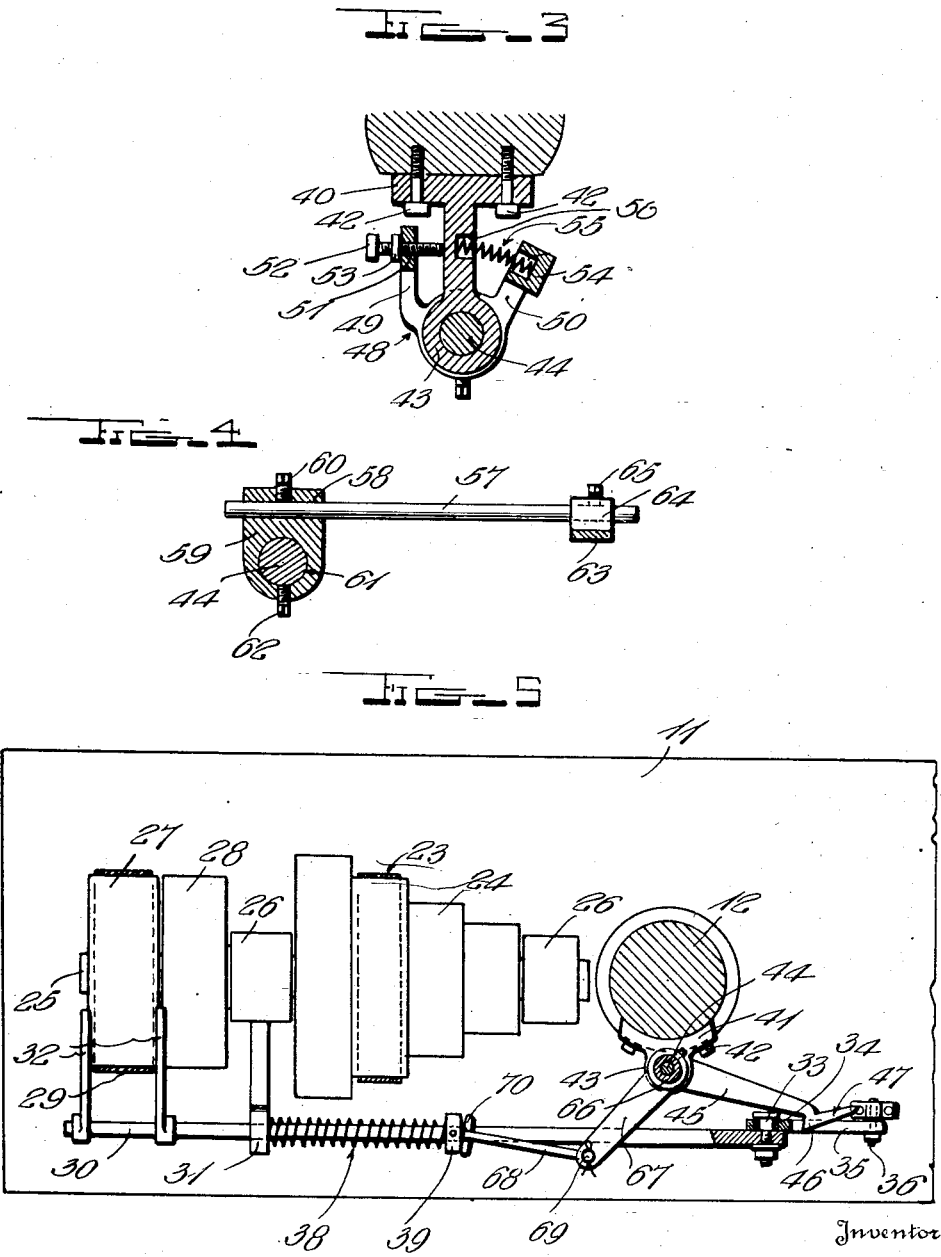
Paul Theadore

UNITED STATES PATENT OFFICE.

PAUL THEADORE, OF LANSING, MICHIGAN.

SAFETY-STOP APPARATUS.

1,273,951. Specification of Letters Patent. Patented July 30, 1918.

Application filed May 7, 1918. Serial No. 233,063.

*To all whom it may concern:*

Be it known that I, PAUL THEADORE, a citizen of the United States, residing at Lansing, in the county of Ingham and State of Michigan, have invented certain new and useful Improvements in Safety-Stop Apparatus, of which the following is a specification.

My invention relates to an automatic safety apparatus for use in connection with drill presses or other more or less similar machines, to stop the same, in case of accident.

An important object of the invention is to provide apparatus of the above mentioned character, which is quick and reliable in operation.

A further object of the invention is to provide apparatus of the above mentioned character, which is simple in construction, cheap to manufacture, strong and durable.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, showing the same holding the belt upon the tight pulley, Fig. 2 is a similar view with the apparatus shifted to move the belt upon the loose pulley, Fig. 3 is a horizontal sectional view taken on line 3—3 of Fig. 1, Fig. 4 is a similar view taken on line 4—4 of Fig. 1, and, Fig. 5 is a similar view taken on line 5—5 of Fig. 1.

In the drawings, wherein for the purpose of illustration is shown a preferred embodiment of my invention, the numeral 10 designates a drill press as a whole, embodying a base 11 and vertical standard 12, rigidly secured thereto. Formed upon the upper end of the standard 12 is a head 13, having vertical bearings 14. The vertical bearings receive a vertical spindle 15 carrying a bit 16, or other tool. The vertical spindle 15 receives its rotation from a horizontal bevel gear 17, driven by a vertical bevel gear 18, rigidly secured to a horizontal shaft 19. The shaft 19 is journaled through horizontal bearings 20 and 21, as shown. The shaft 19 receives its rotation from a stepped pulley 22, rigidly secured thereto, and engaged by a belt 23, extending downwardly to engage a stepped pulley 24, rigidly secured upon a lower horizontal shaft 25. This shaft is journaled through stationary bearings 26. The shaft 25 is equipped with a tight pulley 27 rigidly secured thereto and a loose pulley 28, arranged adjacent the same and free to rotate upon the shaft 25. A shiftable belt 29 is adapted to be moved from either pulley 27 and 28 to the other, and this belt engages at its upper portion with a driving pulley, not shown.

My improved safety device comprises a belt shifter, embodying a horizontal reciprocatory rod 30, mounted within a stationary guide or bearing 31, as shown. One end of the rod 30 carries a pair of shifting tines 32, contacting with the opposite edges of the belt 29, as shown. The forward end of the rod 30 carries a bolt 33, operating within an elongated slot 34, formed in the upper end of a vertically swinging lever 35, pivoted at its lower end as shown at 36. A treadle 37 is secured to the upper end of the lever 35. The rod 30 is automatically moved forwardly or to the right in Figs. 1 and 2, by means of a compressible coil spring 38, one end of which engages the stationary guide 31 and the opposite end of which engages a sleeve 39, rigidly secured to the rod 30. The numerals 40 and 41 designate brackets, which are rigidly secured to the standard 12, by means of bolts 42. These brackets are provided at their outer ends with apertured heads or bearings 43, rotatably receiving therein a vertical shaft 44.

At its lower end this vertical shaft 44 has a crank 45 rigidly secured thereto, which is provided at its free end with a dog 46, adapted to engage upon the forward side of the lever 35, and prevent such lever moving forwardly. The dog 46 has a beveled face 47, adapted for sliding contact with the lever 35.

At its upper end, the shaft 44 has a bracket 48 rigidly secured thereto, said bracket comprising arms 49 and 50. The arm 49 is provided with a screw-threaded opening 51, receiving an adjustable stop screw 52, carrying a lock nut 53, as shown. The stop screw 52 is arranged to contact with the web of the bracket 40. The arm 50 is provided with a cup-shaped head 54, receiving therein one end of a compressible coil spring 55, the opposite end of which is disposed within a recess 56, formed in the web of the bracket 40. It is thus apparent that the spring 55 and associated elements serve to retain the bracket 48 in the normal position, and this bracket retains the shaft 44 in a normal position. When the lever 35 is forced rearwardly in contact with the inclined face 47, the spring 55 will yield, thereby allowing the crank 45 to swing inwardly sufficiently, so that the lever 35 may become locked behind the dog 46, and be held thereby against forward movement, until the shaft 44 is turned in the proper direction.

The numeral 57 designates a horizontal rod or crank arranged near and spaced from the upper end of the vertical shaft 44. This rod or crank has one end thereof extended into an opening 58 in a coupling 59, and clamped therein by means of a screw 60. The coupling 59 is provided with an opennig 61, receiving the vertical shaft 44. A screw 62 serves to clamp this coupling to the vertical shaft. A manually operated element, preferably in the form of a vertical plate 63, provided upon one side with a socket 64, receiving the opposite end of the rod or crank 57, extends transversely of the rod 57. A screw 65 is carried by the socket 64 and serves to clamp the same to the rod 57. The plate 63 is arranged in any convenient position, whereby it may be struck or moved by the operator, in case of accident, to swing the same inwardly, thereby turning the vertical shaft 44 counter-clockwise, and effecting a disengagement between the dog 46 and the lever 35.

Surrounding the vertical shaft 44 is a sleeve or tube 66, which is freely pivoted thereon. The lower end of this sleeve contacts with the lower bearing 43, while its upper end contacts with the socket 59, whereby the vertical shaft 44 is held against downward displacement.

At its lower end, the sleeve 66 has a horizontal crank 67 rigidly secured thereto, such crank having pivotal connection at its free end with a link 68, as shown at 69. The free end of the link 68 is bent into the form of an eye or loop 70, surrounding the rod 30, and slidably engaging the same. The eye or loop 70 contacts with the sleeve 39.

Rigidly connected with the upper end of the sleeve 66 is a hand crank 71, by means of which the sleeve 66 may be turned upon the vertical shaft 44.

The operation of the apparatus is as follows:

To start the drill press in operation, the crank 71 is turned rearwardly or away from the spindle 15, and this swinging movement of the crank turns the sleeve 66 clockwise. This movement of the sleeve swings the crank 67 rearwardly, which in turn moves the link 68 rearwardly. This link shifts the reciprocatory rod 30 rearwardly, thereby placing the spring 38 under compression. Upon the rearward movement of the rod 30, the lever 35 is swung rearwardly and engages behind the dog 46, which locks the rod 30 against forward movement. Upon this rearward movement of the rod 30, as above indicated, the tines 32 shift the belt 29 upon the tight pulley 27, and the drill press is set into action. In case of accident, the operator strikes the plate 63, swinging the same inwardly. This turns the shaft 44 upon its longitudinal axis in a counter-clockwise direction, and the crank 45 is swung inwardly whereby the dog 46 will release the lever 35. The spring 38 will now quickly shift the rod 30 to the right thereby causing the belt 29 to be transferred to the loose pulley 28. The power will be thus cut off from the drill press which will stop when its inertia is overcome.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. Apparatus of the character described, comprising a reciprocatory rod, power shifting mechanism connected with the rod to be moved thereby, a spring adapted to move the rod in one direction, a lever connected with the rod, a shaft arranged near the lever, a dog connected with the shaft to be shifted thereby and adapted to engage with the lever for holding it against movement in one direction, a manually operated device connected with the shaft to turn it in one direction, a sleeve pivoted upon the shaft, a manually operated device to turn the sleeve in one direction, and means arranged between the sleeve and reciprocatory rod whereby the sleeve may move the rod in opposition to the spring.

2. Apparatus of the character described, comprising a reciprocatory rod, power shifting mechanism connected with the rod to be moved thereby, a spring adapted to move the rod in one direction, a lever pivoted with the reciprocatory rod to move with it, a shaft arranged near the lever, a dog connected with the shaft to be shifted thereby and adapted to engage the lever for holding it against movement in one direction, a manually operated device connected with the shaft to turn it in one direction, a sleeve pivoted upon the shaft, a manually operated device to turn the sleeve in one direction, a crank secured to the sleeve, and a link pivotally connected with the crank and adapted to engage with the rod to move the same in one direction in opposition to the spring.

3. Apparatus of the character described, comprising a reciprocatory rod, power shifting mechanism connected with the rod to be moved thereby, a spring to move the rod in one direction, a lever pivoted with the reciprocatory rod to move with it, a shaft arranged near the lever, a dog connected with the shaft to be shifted thereby and adapted to engage with the lever for holding it against movement in one direction and having a beveled face, yielding means to retain the shaft in the normal position, a manually operated device to turn the shaft in one direction, a sleeve pivoted upon the shaft, a manually operated device to turn the sleeve in one direction, and connecting means between the shaft and the rod.

4. Apparatus of the character described, comprising a movable rod, a stationary guide for the rod, a sleeve clamped to the rod, a spring surrounding the rod and confined between the stationary guide and sleeve and adapted to shift the rod in one direction, power shifting mechanism connected with the rod to be moved thereby, lock means to hold the rod against movement in one direction, manually operated means to release the lock means so that the rod is free to move, a manually operated crank, and a link pivoted to the crank and having an eye formed thereon slidably receiving the rod and arranged to contact with the sleeve.

5. Apparatus of the character described, comprising a movable rod, a spring to shift the rod in one direction, power shifting means connected with the rod, a lock device to hold the rod against movement in one direction, manually operated means to actuate the lock device to release the rod, and separate means to reset the rod.

6. Apparatus of the character described, comprising power shifting mechanism, spring means adapted to move the power shifting mechanism in one direction, a lock device adapted to hold the mechanism against movement in one direction, a shaft connected with the lock device to actuate the same, means to turn the saft, a sleeve pivoted upon the shaft and having connection with the shifting mechanism to reset the same, and means to turn the sleeve.

In testimony whereof I affix my signature in presence of two witnesses.

PAUL THEADORE.

Witnesses:
 EDGAR F. BENDER,
 D. R. LIVINGSTONE.

Copies of this patent may be obtained for five cents each, by addressing the "Commissioner of Patents, Washington, D. C."